(12) United States Patent
Staats et al.

(10) Patent No.: US 12,112,628 B2
(45) Date of Patent: Oct. 8, 2024

(54) VEHICLE NETWORK MONITORING SYSTEM

(71) Applicant: Transportation IP Holdings, LLC, Norwalk, CT (US)

(72) Inventors: Andrew Staats, Cedar Rapids, IA (US); Stuart Barr, Cedar Rapids, IA (US)

(73) Assignee: Transportation IP Holdings, LLC, Norwalk, CT (US)

(*) Notice: Subject to any disclaimer, the term of this patent is extended or adjusted under 35 U.S.C. 154(b) by 318 days.

(21) Appl. No.: 17/471,334

(22) Filed: Sep. 10, 2021

(65) Prior Publication Data

US 2023/0085098 A1 Mar. 16, 2023

(51) Int. Cl.
*G08G 1/0967* (2006.01)

(52) U.S. Cl.
CPC . *G08G 1/096791* (2013.01); *G08G 1/096741* (2013.01); *G08G 1/096725* (2013.01)

(58) Field of Classification Search
CPC ....... G08G 1/096791; G08G 1/096741; G08G 1/096725
See application file for complete search history.

(56) References Cited

U.S. PATENT DOCUMENTS

| | | | | |
|---|---|---|---|---|
| 9,187,099 B2* | 11/2015 | Powers | ............. | G08G 1/015 |
| 9,616,897 B2* | 4/2017 | Powers | ............. | G01C 21/3602 |
| 9,903,728 B2* | 2/2018 | Powers | ............. | G08G 1/0129 |
| 10,467,482 B2* | 11/2019 | Lakehal-Ayat | ...... | G06V 10/764 |
| 10,600,258 B1* | 3/2020 | Biemer | ............. | B60W 40/08 |
| 11,305,777 B2* | 4/2022 | Batts | ............. | B60W 60/0015 |
| 11,593,687 B2* | 2/2023 | Ohazulike | ............. | G07C 5/085 |
| 11,644,834 B2* | 5/2023 | Ditty | ............. | G05D 1/0248 701/23 |
| 11,708,066 B2* | 7/2023 | Cserna | ............. | B60W 30/02 701/117 |
| 2002/0124629 A1* | 9/2002 | Hurson | ............. | B60T 8/1725 73/9 |
| 2004/0133324 A1* | 7/2004 | Yasui | ............. | B60T 8/172 701/41 |
| 2006/0080023 A1* | 4/2006 | Hrovat | ............. | B60K 28/16 701/87 |
| 2009/0164063 A1* | 6/2009 | Piccinini | ............. | B60W 30/09 701/45 |
| 2012/0130600 A1* | 5/2012 | Thomson | ............. | E02F 9/2025 701/50 |
| 2012/0203428 A1* | 8/2012 | Choi | ............. | B60G 17/08 701/37 |

(Continued)

FOREIGN PATENT DOCUMENTS

WO WO-2020202356 A1 * 10/2020

*Primary Examiner* — Luis A Martinez Borrero
(74) *Attorney, Agent, or Firm* — K&L Gates LLP (57) ABSTRACT

Reports of traction-altering events between vehicle systems and surfaces of routes being traveled upon by the vehicle systems are received, and one or more areas of interest associated with increased likelihood of one or more additional traction-altering events are identified based on the reports that are received. Signals are communicated to one or more other vehicle systems to one or more of warn the one or more other vehicle systems of the traction-altering events or control movement of the one or more other vehicle systems to avoid the one or more additional traction-altering events.

20 Claims, 2 Drawing Sheets

(56) References Cited

U.S. PATENT DOCUMENTS

| | | | | |
|---|---|---|---|---|
| 2014/0309849 | A1* | 10/2014 | Ricci | G06Q 30/00 701/33.4 |
| 2015/0005988 | A1* | 1/2015 | Cox | B60L 15/2009 701/3 |
| 2015/0166072 | A1* | 6/2015 | Powers | B60W 40/076 701/1 |
| 2015/0203117 | A1* | 7/2015 | Kelly | B60W 40/06 701/91 |
| 2016/0039426 | A1* | 2/2016 | Ricci | B60R 25/20 701/1 |
| 2016/0133130 | A1* | 5/2016 | Grimm | G08G 1/0129 340/905 |
| 2016/0137208 | A1* | 5/2016 | Powers | G08G 1/096725 701/36 |
| 2017/0167881 | A1* | 6/2017 | Rander | B60W 60/0016 |
| 2017/0176196 | A1* | 6/2017 | Powers | G01C 21/3602 |
| 2018/0079424 | A1* | 3/2018 | Myers | B60W 30/02 |
| 2018/0186210 | A1* | 7/2018 | Noll | B60G 17/018 |
| 2018/0208204 | A1* | 7/2018 | Chen | G06F 1/1694 |
| 2019/0051172 | A1* | 2/2019 | Stenneth | G08G 1/163 |
| 2019/0164018 | A1* | 5/2019 | Zhu | G06F 18/251 |
| 2019/0258251 | A1* | 8/2019 | Ditty | G06V 20/58 |
| 2020/0089243 | A1* | 3/2020 | Poeppel | B60W 60/00 |
| 2020/0160068 | A1* | 5/2020 | Silver | G06F 18/217 |
| 2020/0238999 | A1* | 7/2020 | Batts | G08G 1/0112 |
| 2020/0406925 | A1* | 12/2020 | Du | G06F 16/29 |
| 2021/0039630 | A1* | 2/2021 | Oh | B60T 8/175 |
| 2021/0170870 | A1* | 6/2021 | Oh | B60K 17/356 |
| 2021/0213955 | A1* | 7/2021 | Zhao | G06F 18/2431 |
| 2021/0241624 | A1* | 8/2021 | Kan | G07C 5/085 |
| 2022/0227353 | A1* | 7/2022 | Cserna | B60W 60/00 |
| 2022/0315007 | A1* | 10/2022 | Batts | B60W 40/068 |
| 2022/0348227 | A1* | 11/2022 | Foster | G06V 20/588 |
| 2022/0365530 | A1* | 11/2022 | Foster | B60W 60/0015 |
| 2022/0410894 | A1* | 12/2022 | Foster | G06V 20/588 |
| 2023/0085098 | A1* | 3/2023 | Staats | G08G 1/096791 701/117 |
| 2023/0176577 | A1* | 6/2023 | Ditty | G06V 20/588 701/23 |
| 2024/0045426 | A1* | 2/2024 | Ditty | B60W 60/0015 |

* cited by examiner

VEHICLE NETWORK MONITORING SYSTEM

BACKGROUND

Technical Field

The subject matter described herein relates to systems and methods that monitor movements of vehicle systems.

Discussion of Art.

Some vehicle systems traveling along routes typically rely on friction between wheels of the vehicle systems and surfaces of the route to transfer tractive effort generated by the vehicle systems to the interface between the wheels and route surface. This transfer generates propulsion to move the vehicle systems along the routes.

But the wheels may lose friction with the route surface. For example, wheels may slip on the route surface such that the wheels are rotating faster on the route than would otherwise occur with the moving speed of the vehicle system. This can be referred to as a wheel slip event. As another example, wheels may slide on the route surface such that the wheels are rotating slower (or are not rotating) on the route than would otherwise occur with the moving speed of the vehicle system. This can be referred to as a wheel slide event.

Either of these events can interfere with operation of the vehicle systems. For example, some vehicle systems rely on the wheels maintaining friction with the route surface (and avoiding wheel slip events and wheel slide events) for monitoring the moving speed of the vehicle systems (e.g., via wheel tachometer outputs). Wheel slip events or wheel slide events can cause the wheel tachometer outputs to indicate that the vehicle system is moving faster (e.g., during a wheel slip event) or slower (e.g., during a wheel slide event) over the route than the vehicle system is actually moving. Disruption of the ability to accurately determine the moving speed of the vehicle system also can interfere with functions of the vehicle system.

Therefore, a need exists for a way to avoid or reduce the number of wheel slip and/or wheel slide events that occur.

BRIEF DESCRIPTION

In one embodiment, a method includes receiving reports of traction-altering events between vehicle systems and surfaces of routes being traveled upon by the vehicle systems, identifying one or more areas of interest associated with increased likelihood of one or more additional traction-altering events based on the reports that are received, and communicating signals to one or more other vehicle systems to one or more of warn the one or more other vehicle systems of the traction-altering events or control movement of the one or more other vehicle systems to avoid the one or more additional traction-altering events.

In one embodiment, a system includes a controller that may be configured to receive reports of traction-altering events between vehicle systems and surfaces of routes being traveled upon by the vehicle systems. The controller may be configured to identify one or more areas of interest associated with increased likelihood of one or more additional traction-altering events based on the reports that are received. The controller may be configured to communicate signals to one or more other vehicle systems to one or more of warn the one or more other vehicle systems of the traction-altering events or control movement of the one or more other vehicle systems to avoid the one or more additional traction-altering events.

In one embodiment, a method may include receiving reports of traction-altering events between vehicle systems and surfaces of routes being traveled upon by the vehicle systems, determining whether more of the traction-altering events are reported from the vehicle systems controlled by one or more first operators or first drivers relative to the vehicle systems controlled by one or more second operators or second drivers, and communicating signals to one or more other vehicle systems that are controlled by the one or more first operators or first drivers and not to the one or more other vehicle systems controlled by the one or more second operators or second drivers. The signals may be communicated to control movement of the one or more other vehicle systems to avoid the one or more additional traction-altering events.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to vehicle network monitoring systems and methods that receive detections of traction-altering events of vehicle systems and use these detections to assist other vehicle systems to avoid additional traction-altering events. For example, a first vehicle system may detect a wheel slip event or a wheel slide event (either or both referred to as traction-altering events or adhesion-modifying events) at a location. The first vehicle system can notify an off-board vehicle network monitoring system of the location where the traction-altering event was detected. This monitoring system can then communicate the location and/or type of the detected traction-altering event to one or more other vehicle systems. These other vehicle system(s) can then notify onboard operators or drivers and/or automatically implement one or more responsive actions to limit or avoid experiencing a traction-altering event as the other vehicle system(s) travel through or over the location where the traction-altering event previously was detected by the first vehicle system. Additionally or alternatively, the monitoring system can examine the reports of locations of the traction-altering events and determine whether the occurrences of the traction-altering events is due to improper operator control of a vehicle system or due to a condition, state, or health of the routes. For traction-altering events associated with operator control, the monitoring system can notify or warn the corresponding operator or a supervisor of the operator, can change the schedule of one or more operators or vehicle systems to avoid the same operator associated with the traction-altering events from controlling a vehicle system in the same location as prior traction-altering events. For traction-altering events associated with the state of the route, the monitoring system can direct or control the repair or cleaning of the route (e.g., by directing or controlling one or more maintenance crews to the locations of the events). Because these events can be caused by a variety of sources (e.g., leaves or other debris on the route, unfavorable weather conditions such as precipitation and/or ice, or other hazards like oil on the route), the monitoring system can rectify, eliminate, or otherwise fix the problem with the route that is giving rise to the events.

While one or more embodiments are described in connection with a rail vehicle system, not all embodiments are limited to rail vehicle systems. Unless expressly disclaimed or stated otherwise, the inventive subject matter described herein extends to multiple types of vehicle systems. These vehicle types may include automobiles, trucks (with or without trailers), buses, marine vessels, aircraft, mining vehicles, agricultural vehicles, or other off-highway vehicles. The vehicle systems described herein (rail vehicle systems or other vehicle systems that do not travel on rails or tracks) can be formed from a single vehicle or multiple vehicles. With respect to multi-vehicle systems, the vehicles can be mechanically coupled with each other (e.g., by couplers) or logically coupled but not mechanically coupled. For example, vehicles may be logically but not mechanically coupled when the separate vehicles communicate with each other to coordinate movements of the vehicles with each other so that the vehicles travel together as a group. Vehicle groups may be referred to as a convoy, consist, swarm, fleet, platoon, and train.

Figure 1:
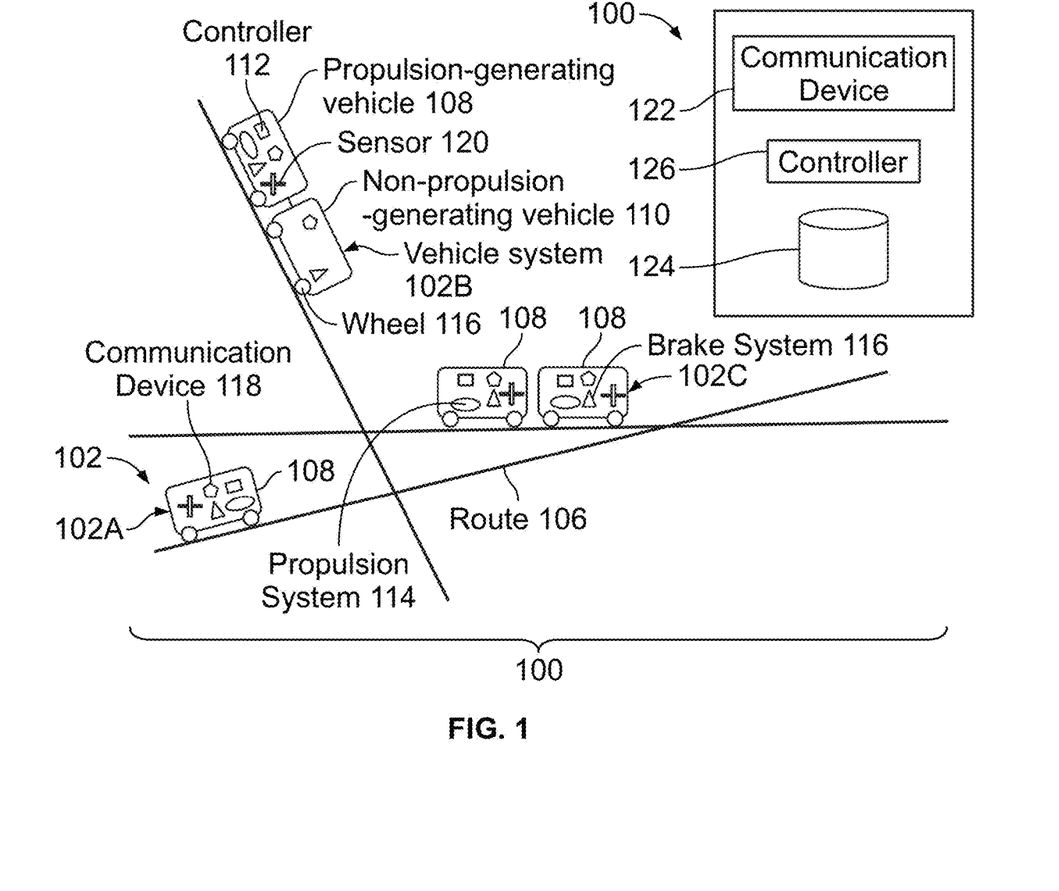
FIG. 1 illustrates one example of a vehicle network monitoring system.

FIG. 1 illustrates one example of a vehicle network monitoring system 100. The monitoring system includes one or more components disposed off-board vehicle systems 102 (e.g., 102A-C in FIG. 1) that travel within a network 104 of interconnected routes 106. The routes can represent tracks, roads, paths, or the like. The vehicle systems may be formed from a single propulsion-generating vehicle 108 (e.g., the vehicle system 102A) or from multiple vehicles (e.g., the vehicle systems 102B, 102C), such as one or more of the propulsion-generating vehicles and, optionally, one or more non-propulsion-generating vehicles 110. The propulsion-generating vehicles can be locomotives, automobiles, trucks, mining vehicles, tractors, etc. The non-propulsion-generating vehicles can be rail cars, trailers, etc. The multi-vehicle systems can include vehicles mechanically coupled with each other (e.g., by couplers, hitches, or the like), such as the vehicle system 102B. Optionally, one or more of the multi-vehicle systems can include vehicles that are not mechanically coupled, but that travel together (e.g., in a convoy), such as the vehicle system 102C.

The vehicle systems can include an onboard controller 112 that represents hardware circuitry that includes and/or is connected with one or more processors (e.g., one or more microprocessors, field programmable gate arrays, integrated circuits, or the like) that perform the operations described herein in connection with the onboard controller. The onboard controller can communicate with one or more of a propulsion system 114 and/or a brake system 116 of the vehicle system to control or change movement of the vehicle. The propulsion system represents one or more motors, engines, alternators, generators, or the like, that perform work to rotate one or more wheels 116 of the vehicle. The brake system represents components that operate to slow or stop movement of the vehicle, such as one or more motors of the propulsion system (e.g., via dynamic or regenerative braking), friction brakes, air brakes, or the like.

An onboard communication device 118 includes transmitting and/or transceiving circuitry and associated hardware (e.g., transceivers, receivers, modems, antennas, etc.) for communicating with components that are off-board the vehicle. For example, the onboard controller can receive and/or send communication signals to other vehicles, to the monitoring, and the like, using the communication device. One or more of the vehicle systems can include one or more sensors 120 that detect wheel slip and/or wheel slide events. For example, the sensor can be a wheel tachometer that measures rotational speeds of wheels. The onboard controller can receive signals output by the sensor and determine whether a wheel slip or wheel slide event occurred. The onboard controller can identify a wheel slip or wheel slide event based on significant and temporary changes in measured wheel rotational speeds (e.g., with an event detected when the wheel rotational speed increases or decreases by more than 50% for less than three seconds).

The sensors may include a positional sensor that outputs information indicative of or useful to determine the location of the sensors. For example, the sensors can include global navigation satellite system (GNSS) receivers (e.g., a global positioning system, or GPS, receiver) that output signals to the onboard controller indicative of the geographic location of the sensors. The onboard controller can determine the location of the vehicle system using this information. The onboard controller can report the detection of a wheel slip event or a wheel slide event, along with the geographic location (e.g., longitude and latitude coordinates) where the wheel slip event or the wheel slide event was detected to occur. This report can be wirelessly communicated from the communication device of the vehicle system to a communication device 122 of the monitoring system.

The communication device of the monitoring system can be referred to as the off-board communication device. While the monitoring system is shown as being located off-board all of the vehicle systems, alternatively, one or more of the components (or all of the components) of the monitoring system may be disposed onboard one or more of the vehicle systems.

The off-board communication device includes transmitting and/or transceiving circuitry and associated hardware (e.g., transceivers, receivers, modems, antennas, etc.) for communicating with components such as the onboard communication devices of the vehicle systems. The monitoring system optionally includes a tangible and non-transitory computer readable medium (e.g., a memory 122, such as a computer hard drive, server, removable disk, or the like).

During movement of the vehicle systems along the routes, the vehicle systems may detect traction-altering events. The onboard controllers can determine the locations of the vehicle systems where the events were detected. The onboard controllers can send signals to a controller 124 of the monitoring system (which can represent one or more processors and can be referred to as an off-board controller).

The off-board controller can store or otherwise record the locations of the traction-altering events in the memory. Optionally, the off-board controller can store one or more additional items of information or data received from the signals sent from the onboard controller. For example, the signals sent by the onboard controllers to the off-board controller can include an identification of the vehicle system, an identification of the operator or driver of the vehicle system, the time and/or date at which the traction-altering event occurred, the direction that the vehicle system was moving when the traction-altering event occurred, the speed that the vehicle system was moving when the traction-altering event occurred, the size (e.g., length and/or number of vehicles) and/or weight of the vehicle system, the type of event that was detected (e.g., a wheel slip event versus a wheel slide event), the grade of the route where the event was detected, the weather condition(s) in which the event was detected (e.g., temperature, precipitation amount and/or type, wind direction and speed, etc.), and/or the like. Optionally, at least some of this additional information may be stored in the memory of the monitoring system and/or obtained from the memory by the off-board controller. For example, the memory may include a route database containing data representing the grades at different locations or segments of the routes. The off-board controller can compare the reported location of an event with the database to identify the grade of the route where the event occurred. The off-board controller optionally can obtain the weather conditions from another source, such as a weather reporting station or entity.

The off-board controller can examine the reported locations of the traction-altering events by different vehicle systems. The off-board controller can compare these locations with each other to determine whether certain locations are associated with more events than other locations. For example, the off-board controller can identify areas of interest 126 where at least a threshold number of events have been reported, where the number of events reported there has increased by either a threshold number or a threshold percentage, where the difference between the number of reported events and the average or median number of reported events in other areas is greater than a threshold number, where the top three, top five, top ten, etc. concentrations of reported events were reported, etc. The areas of interest optionally can define clusters of reported events, such as areas where at least a threshold density of the reported events occurred.

The off-board controller can send signals to the vehicle systems based on the areas of interest that were identified. These signals can warn the vehicle systems of the areas of interest, change automated control of the vehicle systems, and/or automatically change movement of the vehicle systems. With respect to warning the vehicle systems, the off-board controller can notify the vehicle systems where the areas of interest are identified. The onboard controllers of those vehicle systems can track where the vehicle systems are located and/or headed, and generate an audible and/or visual warning to the operators or drivers of the vehicle systems as the vehicle systems approach (e.g., come within a threshold distance, such as a stopping distance) the areas of interest. This can warn the driver or operator of the upcoming area of interest to change operation of the vehicle system, such as by slowing or stopping movement of the vehicle system, reducing torque generated by the propulsion system, increasing speed of the vehicle system, increasing torque generated by the propulsion system, to exit the route currently being traveled upon and entering onto another route to avoid the area of interest, or the like. One or more of these responsive actions can reduce the magnitude (e.g., the duration) of the event and/or prevent the event from occurring with the vehicle system that received the warning from the off-board controller.

With respect to changing automated control of the vehicle systems or automatically changing operation of the vehicle systems, the onboard controllers of the vehicle systems can be onboard components of a positive vehicle control system, such as a positive train control (PTC) system (with the monitoring system representing a back office server of the PTC system). The positive vehicle control system can include or be represented by the monitoring system in FIG. 1. The positive vehicle control system can send signals to the vehicle systems informing the vehicle systems of whether the vehicle systems are permitted to enter one or more segments of the routes (e.g., movement authorities), speed limits of the route segments (e.g., speed restrictions), locations of routes where maintenance crews are presented, or the like. Absent receiving a signal from the positive vehicle control system at the onboard controller, the onboard controller will automatically prevent entry of the vehicle system into a route segment (for which a signal granting permission to enter was not received from the positive vehicle control system), automatically prevent the vehicle system from moving faster than a speed restriction, etc. The onboard controller can automatically control the propulsion system and/or brake system to prevent the vehicle system from moving in a way that is not permitted by a signal received from the positive vehicle control system.

The off-board controller can change a speed restriction, change or create a movement authority, or the like, to reduce or eliminate the instances of additional traction-altering events for the vehicle systems headed to or through areas of interest. For example, the off-board controller can reduce a speed limit of a portion or segment of a route that includes an identified area of interest. As another example, the off-board controller can create an instruction that directs the vehicle system to stop or move onto another route to avoid an identified area of interest. Reducing speed limits and/or creating/implementing movement authorities can reduce the instances and/or durations of events for the vehicle systems traveling through the area(s) of interest.

The onboard controllers of the vehicle systems can be onboard components of a negative vehicle control system. The negative vehicle control system can include or be represented by the monitoring system in FIG. 1. The negative vehicle control system can send signals to the vehicle systems informing the vehicle systems of whether the vehicle systems are not permitted to enter one or more segments of the routes. Absent receiving a signal from the negative vehicle control system at the onboard controller, the onboard controller will automatically prevent entry of the vehicle system into a route segment only if a signal prohibiting entry of the vehicle system into that segment. The off-board controller can send signals to the vehicle systems to prevent the vehicle systems from moving through an area of interest, to cause the vehicle systems to slow down during movement through an area of interest, to enter onto another route to avoid traveling through an area of interest, etc.

The off-board controller optionally can send control signals to the onboard controller to remotely control the propulsion system and/or brake system to change movement ahead of reaching an area of interest. For example, the off-board controller can remotely slow or stop movement of the vehicle system, reduce torque generated by the propulsion system, increasing speed of the vehicle system, reduce torque generated by the propulsion system, change steering of the vehicle system or a state of a switch in the route to cause the vehicle system to exit the route currently being traveled upon and entering onto another route to avoid the area of interest, or the like. One or more of these responsive actions can reduce the magnitude of the event and/or prevent the event from occurring with the vehicle system that received the warning from the off-board controller.

The off-board controller can broadcast the signals to the vehicle systems to warn the vehicle systems of the areas of interest. Optionally, the off-board controller can transmit the signals to some, but not all, of the vehicle systems for different areas of interest. For example, the off-board controller can address or send the signals to particular ones of the vehicle systems depending on where an area of interest is located and movement characteristics of the vehicle systems. The movement characteristics of a vehicle system can include information such as the route that the vehicle system is traveling on or will be traveling on, the direction in which the vehicle system is moving along the route, the size of the vehicle system, the weight of the vehicle system, an identification of the vehicle system, an identification of the operator or driver of the vehicle system, or the like. The off-board controller can examine the movement characteristics of different vehicle systems (as may be communicated from the vehicle systems to the off-board controller and/or stored in the memory) to determine which vehicle systems should receive signals about the area(s) of interest.

For example, the off-board controller can send notification signals to those vehicle systems moving toward an area of interest on the same route as the area of interest (but not send the notification signals to vehicle systems that are not traveling toward the area of interest. As another example, the off-board controller can send the notification signals to vehicle systems scheduled to travel and/or heading toward the area of interest, but that may not yet be on the same route as the area of interest. The off-board controller can send the notification signals to vehicle systems that are larger (e.g., longer) than a size threshold and/or heavier than a weight threshold (and, optionally, are headed toward an area of interest), and not send the signals to lighter or smaller vehicle systems, as the larger or heavier vehicle systems may be more likely to experience the traction-altering event than the lighter or smaller vehicle systems. The off-board controller can send the notification signal to vehicle systems that are traveling toward an area of interest while the area of interest is within or undergoing the same weather conditions or pattern as when traction-altering events in the area were identified. For example, if the area of interest is identified from several wheel slip and/or wheel slide events that occurred while the temperature was below a threshold temperature (e.g., freezing), then the off-board controller can send the notification signals to vehicle systems traveling toward the area and the temperature at the area is at or below freezing. As another example, if the area of interest is identified from several wheel slip and/or wheel slide events that occurred while there was rain or snow present, then the off-board controller can send the notification signals to vehicle systems traveling toward the area and while it is raining or snowing at the area. The off-board controller can make these types of selective notifications to warn the vehicle systems of the areas while it is more likely for the vehicle systems to experience wheel slips or wheel slides, and to avoid sending too many notifications to vehicle systems where it is less likely for the vehicle systems to experience wheel slips or wheel slides (as excessive notifications may be ignored).

The off-board controller can direct one or more changes to routes based on the areas of interest that are identified and/or the events that are reported. As one example, the off-board controller can send signals to direct maintenance crews or personnel to change a grade or curvature of a route segment where an area of interest was identified. The maintenance crews or personnel can add or remove material (e.g., ballast) to increase or decrease a grade of the route (e.g., make the route segment more level), can change the layout of a route segment (e.g., to decrease curvature of the route), or the like.

Some drivers or operators of vehicle systems may desire to control vehicle systems in ways that cause protective or control systems from being able to restrict how the vehicle systems are controlled. For example, some positive control systems (e.g., PTC systems as one example) may restrict movement of vehicle systems unless or until abnormal events occur, such as a wheel slip or wheel slide event. These types of control systems may terminate or temporarily pause the restrictions placed on how the vehicle systems are controlled responsive to wheels slipping or sliding, as the speeds of the vehicle systems that are monitored by the positive control systems for ensuring compliance with the restrictions may be inaccurate or unreliable. Some drivers or operators may intentionally create a wheel slip event or a wheel slide event by rapidly increasing the torque applied to one or more wheels (to cause a wheel slip event to occur) or by rapidly engaging brakes (to cause a wheel slide event to occur). This can cause a termination or temporary pause on enforcement of the positive control system restrictions on movement of the vehicle systems.

The off-board controller can monitor the traction-altering events along with identifications of the operators or drivers of the vehicle systems associated with the events. The off-board controller can determine whether some operators or drivers have more events than other operators or drivers. The operators or drivers with increased numbers of events or rates at which the events are reported may be identified by the off-board controller. The off-board controller can then enforce additional restrictions on the vehicle systems being controlled by the identified operators or drivers and/or automatically control the vehicle systems being controlled by the identified operators or drivers to avoid or reduce the number of events that occur. For example, the off-board controller may not permit the operators or drivers to rapidly increase torque exerted on wheels and may direct the onboard controllers of those vehicle systems to reduce the rate at which the operators or drivers are able to increase torque. This can help prevent additional events from occurring, and may cause the vehicle systems to be operated according to the restrictions of the positive control systems more so than if the identified operators or drivers were not restricted on how they control the vehicle systems.

The off-board controller can eliminate or de-identify one or more areas of interest. For example, if no traction-altering events within a previously identified area of interest are reported within an area of interest for at least a designated period of time (e.g., a week, a month, several weeks, several months, etc.), then the off-board controller can eliminate the area of interest. As another example, if the number or rate at which traction-altering events are reported decreases below a threshold number or rate, then the off-board controller can eliminate the area of interest. In another example, if the area of interest was identified from events detected during a weather condition (e.g., freezing temperatures, precipitation, etc.), the off-board controller can eliminate the area of interest once the weather condition is no longer present (e.g., temperatures are above freezing, no longer raining or snowing, etc.). The off-board controller can eliminate the area of interest by no longer recognizing the area of interest as a location or group of locations where there is increased risk of a traction-altering event. The off-board controller may then no longer notify or control vehicle systems traveling toward or through the area of interest (e.g., to avoid the events), subject to a subsequently increasing number of reports of such events in the same area.

Figure 2:
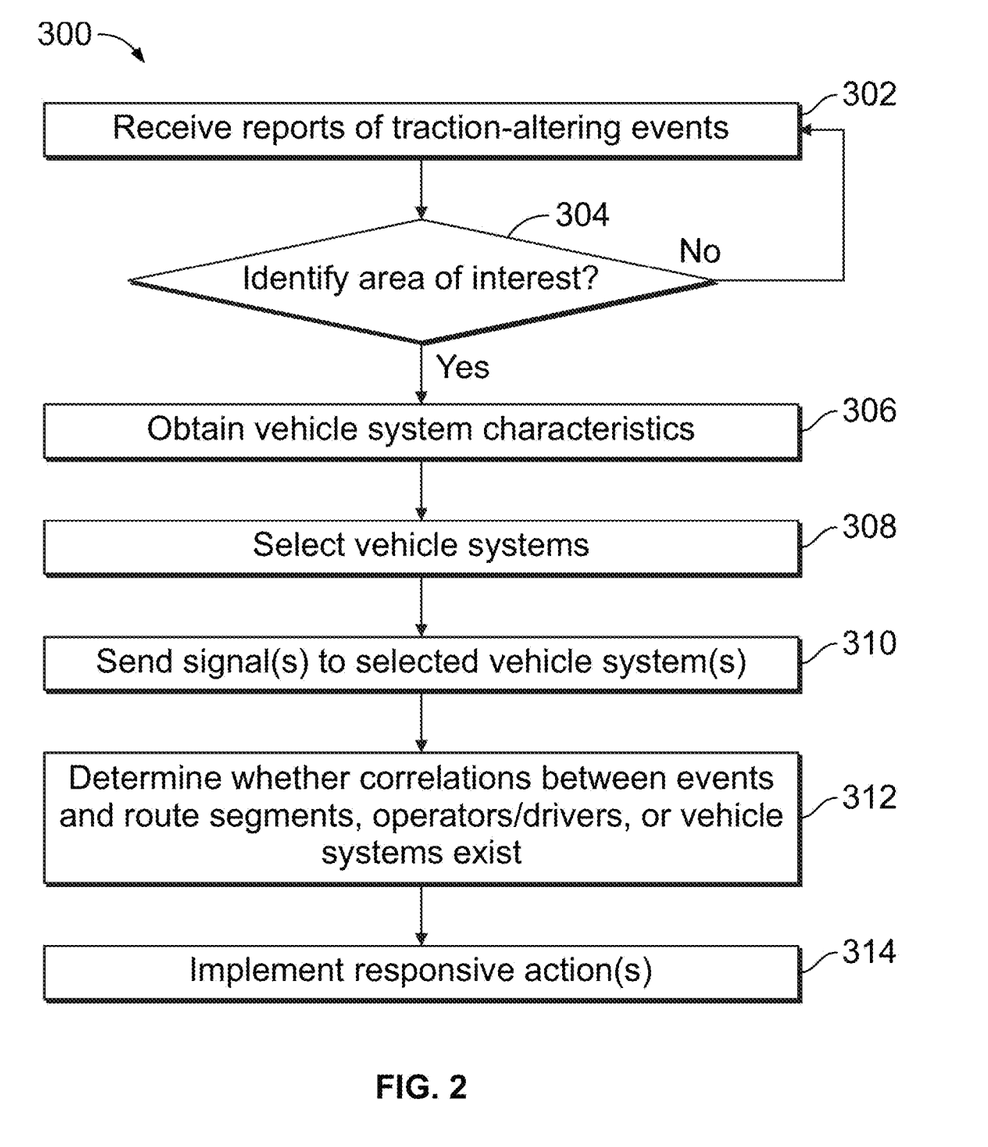
FIG. 2 illustrates a flowchart of one example of a method for monitoring and/or controlling movements of vehicle systems.

FIG. 2 illustrates a flowchart of one example of a method 300 for monitoring and/or controlling movements of vehicle systems. The method can represent operations performed by the monitoring system described herein. At step 302, reports of detected traction-altering events are received. The reports can be received at an off-board controller from different vehicle systems traveling in a network of routes. At step 304, a decision is made as to whether a sufficient number of events occur within an area to identify the area as an area of interest. For example, if a number or density of reported events within an area exceeds a designated threshold, then this area may be identified as an area of interest. The area of interest can indicate a location or several locations where there are more traction-altering events relative to other locations or areas. If there are a sufficient number or density of events reported, then flow of the method can proceed toward step 306. Otherwise, flow of the method can terminate or return to another operation, such as step 302.

At step 306, characteristics of vehicle systems are obtained. As described above, these characteristics can include scheduled routes of the vehicle systems, routes being currently traveled upon by the vehicle systems, identifications of the vehicle systems and/or operators of the vehicle systems, weights and/or sizes of the vehicle systems, etc. The characteristics can be obtained from a memory, reported by the vehicle systems, obtained from manifests, etc. At step 308, a decision is made as to which vehicle systems are to be notified of an area of interest. The decision can be made to notify those vehicle systems traveling toward or scheduled to travel through the areas or interest, those vehicle systems that are heavier and/or larger than other vehicle systems, those vehicle systems that experience more traction-altering events than other vehicle systems, etc.

At step 310, a notification signal is sent to the vehicle system(s) identified at step 308. The notification signal can be sent to warn the vehicle systems of the location of the area of interest. Optionally, the notification signal can be a control signal that directs or restricts control of the vehicle systems, or that automatically controls the vehicle system, to avoid or reduce the likelihood of the vehicle systems experiencing a traction-altering event while the vehicle systems travel through the area of interest. For example, the control signal can automatically slow down the vehicle systems, can automatically reduce torque generated by propulsion systems of the vehicle systems, can cause the vehicle systems to bypass the area of interest on another route, etc. As another example, the signals can provide restrictions, but not automatically control, the vehicle systems. These restrictions can provide upper limits on the torque generated by the propulsion systems and/or speeds that the vehicle systems are allowed to travel to reduce the likelihood of a traction-altering event occurring during travel through the area of interest. Optionally, the notification signal can be broadcast to all vehicle systems within a communication range (e.g., of the monitoring system).

At step 312, the reported traction-altering events are examined to determine whether any correlations between the events and the same route segments, the same operators or drivers of vehicle systems, or the same vehicles exist. The controller of the monitoring system can examine the reported events to determine if more events are reported for the same route segments more than for other route segments, if more events are reported for the same operators or drivers than other operators or drivers, and/or if more events are reported for the same vehicle systems than for other vehicle systems. If there is a greater concentration of events for the same route segment(s), the same operator(s) or driver(s), and/or the same vehicle system(s) than other route segments, operators or drivers, or vehicle systems, then flow of the method can proceed toward step 314. Otherwise, flow of the method can terminate or proceed to another operation, such as step 302.

At step 314, one or more responsive actions are implemented. As one example, the route segment(s) identified as having more reported events than other route segments can be inspected, repaired, or modified (e.g., the grade and/or curvature changed) to reduce future instances of the events (compared to not modifying the route segment(s)). As another example, the operator(s) or driver(s) identified as having more reported events than other operators or drivers can be warned, or can have more stringent restrictions on how the vehicle systems controlled by the identified operator(s) or driver(s) (compared to other operators or drivers). These restrictions can include slower speed limits, lower limits on torque generated by the vehicle systems, etc. The vehicle system(s) identified as having more reported events than other vehicle systems can have more stringent restrictions on how the vehicle systems can move. These restrictions can include slower speed limits, lower limits on torque generated by the vehicle systems, etc. Flow of the method can terminate or proceed to another operation, such as step 302.

In one embodiment, a method includes receiving reports of traction-altering events between vehicle systems and surfaces of routes being traveled upon by the vehicle systems, identifying one or more areas of interest associated with increased likelihood of one or more additional traction-altering events based on the reports that are received, and communicating signals to one or more other vehicle systems to one or more of warn the one or more other vehicle systems of the traction-altering events or control movement of the one or more other vehicle systems to avoid the one or more additional traction-altering events.

The traction-altering events may include one or more of a wheel slip or a wheel slide. The one or more areas of interest may be identified as locations where more of the traction-altering events have been reported than other locations. The signals that are communicated to the one or more other vehicle systems may include a speed restriction that prohibits the one or more other vehicle systems from moving faster than a speed limit while moving through the one or more areas of interest.

The method also may include receiving characteristics of the one or more other vehicle systems, and selecting a set of the one or more other vehicle systems to send the signals to based on the characteristics, where the signals may be communicated only to the one or more other vehicle systems in the subset. The characteristics may include identifications of the one or more other vehicle systems, identifications of operators or drivers of the one or more other vehicle systems, sizes of the one or more other vehicle systems, and/or weights of the one or more other vehicle systems.

The method also may include determining whether more of the traction-altering events are reported from the vehicle systems controlled by one or more first operators or first drivers relative to the vehicle systems controlled by one or more second operators or second drivers, where the signals may be communicated to one or more other vehicle systems that are controlled by the one or more first operators or first drivers and not to the one or more other vehicle systems controlled by the one or more second operators or second drivers.

In one embodiment, a system includes a controller that may be configured to receive reports of traction-altering events between vehicle systems and surfaces of routes being traveled upon by the vehicle systems. The controller may be configured to identify one or more areas of interest associated with increased likelihood of one or more additional traction-altering events based on the reports that are received. The controller may be configured to communicate signals to one or more other vehicle systems to one or more of warn the one or more other vehicle systems of the traction-altering events or control movement of the one or more other vehicle systems to avoid the one or more additional traction-altering events.

The traction-altering events may include one or more of a wheel slip or a wheel slide. The controller may be configured to identify the one or more areas of interest as locations where more of the traction-altering events have been reported than other locations. The controller may be configured to communicate the signals to include a speed restriction that prohibits the one or more other vehicle systems from moving faster than a speed limit while moving through the one or more areas of interest.

The controller may be configured to determine characteristics of the one or more other vehicle systems, and to select a set of the one or more other vehicle systems to send the signals to based on the characteristics, where the controller may be configured to communicate the signals only to the one or more other vehicle systems in the subset. The characteristics may include identifications of the one or more other vehicle systems, identifications of operators or drivers of the one or more other vehicle systems, sizes of the one or more other vehicle systems, or weights of the one or more other vehicle systems.

The controller may be configured to determine whether more of the traction-altering events are reported from the vehicle systems controlled by one or more first operators or first drivers relative to the vehicle systems controlled by one or more second operators or second drivers. The controller may be configured to communicate the signals to one or more other vehicle systems that are controlled by the one or more first operators or first drivers and not to the one or more other vehicle systems controlled by the one or more second operators or second drivers.

In one embodiment, a method may include receiving reports of traction-altering events between vehicle systems and surfaces of routes being traveled upon by the vehicle systems, determining whether more of the traction-altering events are reported from the vehicle systems controlled by one or more first operators or first drivers relative to the vehicle systems controlled by one or more second operators or second drivers, and communicating signals to one or more other vehicle systems that are controlled by the one or more first operators or first drivers and not to the one or more other vehicle systems controlled by the one or more second operators or second drivers. The signals may be communicated to control movement of the one or more other vehicle systems to avoid the one or more additional traction-altering events.

The method also may include identifying one or more areas of interest associated with increased likelihood of one or more additional traction-altering events based on the reports that are received. The signals that are communicated also may warn the one or more other vehicle systems of the traction-altering events. The one or more areas of interest may be identified as locations where more of the traction-altering events have been reported than other locations. The traction-altering events may include one or more of a wheel slip or a wheel slide. The signals that are communicated to the one or more other vehicle systems may include a speed restriction that prohibits the one or more other vehicle systems from moving faster than a speed limit.

The method also may include receiving characteristics of the one or more other vehicle systems, the characteristics including identifications of the one or more other vehicle systems, identifications of operators or drivers of the one or more other vehicle systems, sizes of the one or more other vehicle systems, or weights of the one or more other vehicle systems, and selecting a set of the one or more other vehicle systems to send the signals to based on the characteristics. The signals may be communicated only to the one or more other vehicle systems in the subset.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
receiving reports of traction-altering events between first vehicle systems and surfaces of routes being traveled upon by the first vehicle systems;
identifying first drivers of the first vehicle systems during the traction-altering events that are received;
identifying one or more areas of interest associated with increased likelihood of one or more additional traction-altering events based on the reports that are received;
communicating first signals to second vehicle systems to one or more of warn the second vehicle systems of the traction-altering events or control movement of the second vehicle systems to avoid the one or more additional traction-altering events; and
communicating second signals to the first vehicle systems or third vehicle systems being controlled by the first drivers, the second signals limiting increases in torque applied to wheels of the first vehicle systems or the third vehicle systems while driven by the first drivers that are identified from the traction-altering events.

2. The method of claim 1, wherein the traction-altering events include one or more of a wheel slip or a wheel slide.

3. The method of claim 1, wherein the one or more areas of interest are identified as locations where more of the traction-altering events have been reported than other locations.

4. The method of claim 1, wherein the first signals that are communicated to the second vehicle systems include a speed restriction that prohibits the second vehicle systems from moving faster than a speed limit while moving through the one or more areas of interest.

5. The method of claim 1, further comprising:
receiving characteristics of the second vehicle systems; and
selecting a subset of the second vehicle systems to send the second signals to based on the characteristics,
wherein the second signals are communicated only to the second vehicle systems in the subset.

6. The method of claim 5, wherein the characteristics include identifications of the second drivers of the second vehicle systems.

7. The method of claim 1, further comprising:
determining whether more of the traction-altering events are reported from the first vehicle systems controlled by the first drivers than the second vehicle systems controlled by the second drivers,
wherein the second signals are communicated to the first vehicle systems or the third vehicle systems that are controlled by the first drivers and not to the second vehicle systems controlled by the second drivers.

8. A system comprising:
a controller configured to receive reports of traction-altering events between first vehicle systems and surfaces of routes being traveled upon by the first vehicle systems, the controller configured to identify one or more areas of interest associated with increased likelihood of one or more additional traction-altering events based on the reports that are received, the controller configured to identify first drivers of the first vehicle systems during the traction-altering events, the controller configured to communicate first signals to second vehicle systems controlled by second drivers to one or more of warn the second vehicle systems of the traction-altering events or control movement of the second vehicle systems to avoid the one or more additional traction-altering events, the controller configured to communicate second signals to the first vehicle systems or to third vehicle systems to restrict increases in torque applied to wheels of the first vehicle systems or the third vehicle systems while driven by the first drivers that are identified from the traction-altering events.

9. The system of claim 8, wherein the traction-altering events include one or more of a wheel slip or a wheel slide.

10. The system of claim 8, wherein the controller is configured to identify the one or more areas of interest as locations where more of the traction-altering events have been reported than other locations.

11. The system of claim 8, wherein the controller is configured to communicate the first signals to include a speed restriction that prohibits the second vehicle systems from moving faster than a speed limit while moving through the one or more areas of interest.

12. The system of claim 8, wherein the controller is configured to determine characteristics of the second vehicle systems, and to select a subset of the second vehicle systems to send the first signals to based on the characteristics,
wherein the controller is configured to communicate the first signals only to the second vehicle systems in the subset.

13. The system of claim 12, wherein the characteristics include identifications of the second drivers of the second vehicle systems.

14. The system of claim 8, wherein the controller is configured to determine whether more of the traction-altering events are reported from the first vehicle systems controlled by the first drivers than the second vehicle systems controlled by the second drivers,
wherein the controller is configured to communicate the second signals to the second vehicle systems or the third vehicle systems that are controlled by the first drivers and not to the second vehicle systems controlled by the second drivers.

15. A method comprising:
receiving reports of traction-altering events between vehicle systems and surfaces of routes being traveled upon by the vehicle systems;
determining whether more of the traction-altering events are reported from the vehicle systems controlled by first drivers than the vehicle systems controlled by second drivers; and
communicating signals to the vehicle systems that are controlled by the first drivers and not to the vehicle systems controlled by the second drivers, responsive to a determination that more of the traction-altering events are reported from the vehicle systems controlled by first drivers than the vehicle systems controlled by second drivers, the signals communicated to control movement of the vehicle systems controlled by the first drivers to avoid one or more additional traction-altering events.

16. The method of claim 15, further comprising:
identifying one or more areas of interest associated with increased likelihood of one or more additional traction-altering events based on the reports that are received,
wherein the signals that are communicated also warn the vehicle systems of the traction-altering events.

17. The method of claim 16, wherein the one or more areas of interest are identified as locations where more of the traction-altering events have been reported than other locations.

18. The method of claim 15, wherein the traction-altering events include one or more of a wheel slip or a wheel slide.

19. The method of claim 15, wherein the signals that are communicated to the vehicle systems include a speed restriction that prohibits the vehicle systems from moving faster than a speed limit.

20. The method of claim 15, wherein the signals are first signals, and further comprising:
- communicating one or more second signals to one or more supervisors of the first drivers to notify the one or more supervisors of the traction-altering events experienced by the first drivers;
- changing schedules of the first drivers to avoid the first drivers controlling the vehicle systems in locations where the traction-altering events were detected; and
- communicating one or more third signals to a maintenance crew to repair or clean routes in the locations where the traction-altering events were detected.

* * * * *